United States Patent

[11] 3,571,496

[72] Inventor William H. Slavik
Oak Lawn, Ill.
[21] Appl. No. 748,429
[22] Filed July 29, 1968
[45] Patented Mar. 16, 1971
[73] Assignee Motorola, Inc.
Franklin Park, Ill.

[54] COMBINED ACC AMPLIFIER AND REGENERATIVE COLOR KILLER
8 Claims, 1 Drawing Fig.

[52] U.S. Cl. .......... 178/5.4, 307/255
[51] Int. Cl. .......... H04n 9/48, H03k 17/00
[50] Field of Search .......... 178/5.4 (4C3), 5.4 (ACC), 5.4 (CK); 307/255

[56] References Cited
UNITED STATES PATENTS
3,374,366 3/1968 Kleinberg .......... 307/255
3,070,654 12/1962 Macouski .......... 178/5.4ACC

*Primary Examiner*—Richard Murray
*Assistant Examiner*—George G. Stellar
*Attorney*—Mueller and Aichele

ABSTRACT: The ACC amplifier of a color television receiver is also used as part of a regenerative color killer circuit in order to reduce the number of components used.

Patented March 16, 1971 3,571,496
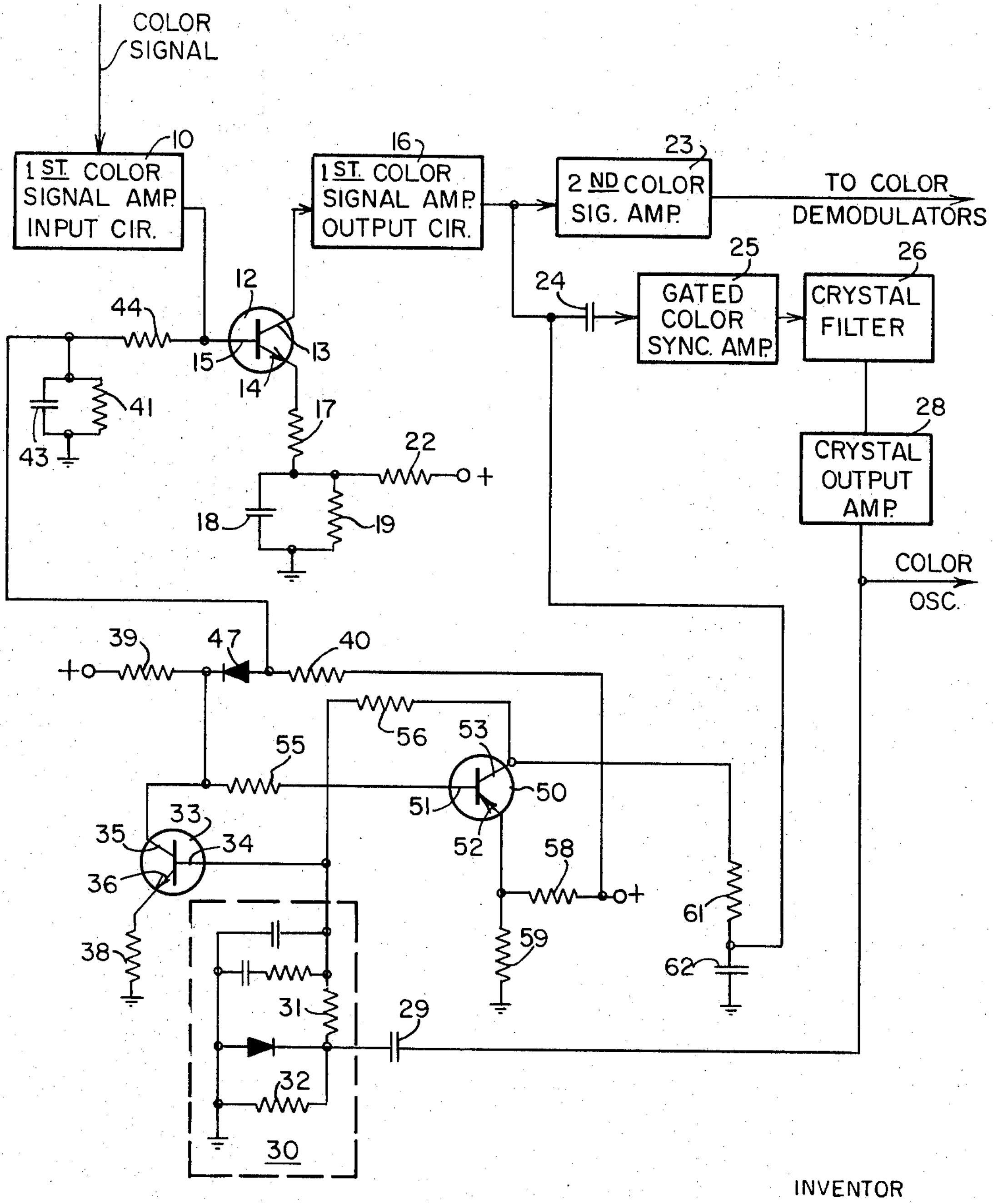
INVENTOR
WILLIAM H. SLAVIK
BY Mueller, Aichele & Rauner
ATTYS.

COMBINED ACC AMPLIFIER AND REGENERATIVE COLOR KILLER

BACKGROUND OF THE INVENTION

In color television receivers a color killer circuit is normally incorporated to prevent signals from passing through the color amplifier stages when no color signal is being received. This is done to prevent noise in the system from producing color specks on the screen when a black and white picture is being received. Color television receivers also incorporate an automatic color control circuit (ACC) which is similar to an automatic gain control circuit. The amplitude of the incoming burst signal is used to regulate the bias on the color amplifier stages to determine the magnitude of the color signal applied to the demodulators. In many television receivers a separate ACC amplifier stage is used to develop this bias signal.

It is greatly desirable to incorporate a color killer circuit which operates in the manner of a switch. To do this a regenerative circuit can be used incorporating positive feedback. However, such a circuit normally requires two active components, for example, two transistors to provide the required switching action. While switching action can be provided with a single active component, the circuitry which would be associated with this single component is necessarily complex. In either case the cost of providing regenerative switching action is costly.

SUMMARY OF THE INVENTION

It is, therefore, an object of this invention to provide an improved color killer and ACC circuit for a color television receiver.

Another object of this invention is to provide a color killer and ACC circuit for a color television receiver in which the components are combined in a single circuit.

In practicing this invention a color television receiver is provided having a combined ACC and color killer circuit. An ACC transistor amplifier circuit and a second transistor are combined to form a regenerative feedback circuit. With no color signal present the color killer circuit is in a first state. When the incoming burst signal reaches a particular level, indicating that a color signal is present, the positive feedback action of the regenerative circuit causes the color killer circuit to switch to a second state. The switching action of the color killer circuit provides a bias voltage to the color amplifier stages enabling these stages to pass the chrominance signal to the color demodulator. When no color signal is present the regenerative action of the color killer causes it to switch to its original state biasing the color signal amplifier stages to prevent a chrominance signal from being passed to the color demodulators.

The gains of the transistors and the feedback circuits of the regenerative circuit are chosen so that when the color killer circuit is in its second state the second transistor is driven to saturation while the ACC amplifier transistor is biased to conduction but is not biased to saturation. Since the ACC amplifier transistor is not biased to saturation, the burst signals applied to the ACC amplifier can be amplified to develop a bias signal regulating the gain of the color amplifiers in accordance with the strength of the color signal to provide an automatic chroma control for the color television receiver.

The invention is illustrated in the single drawing, a partial schematic and partial block diagram of a portion of a color television receiver incorporating the features of this invention.

DETAILED DESCRIPTION

Referring to the FIGURE, a color signal, including color sync bursts, is applied to a first color signal amplifier input circuit 10. The output of the input circuit 10 is applied to base 15 of transistor 12, the first color signal amplifier. The output of the first color signal amplifier is developed at collector 13 and is coupled to a second color signal amplifier 23 through the first color signal amplifier output circuit 16. The output of the second color signal amplifier 23 is coupled to color demodulators for further processing. Emitter 14 of transistor 12 has a bias supplied thereto from a positive power supply through resistors 22, 17 and 19. Capacitor 18 acts as a bypass for resistor 19.

The color burst signals are applied through capacitor 24 to a gated color sync amplifier 25 and from sn sync amplifier 25 through crystal filter 26 to crystal output amplifier 28. The amplified burst signals are coupled from crystal output amplifier 28 to the color oscillator to develop a 3.58 megacycle signal having the proper phase for color demodulation. The amplified burst signals are also applied through capacitor 29 and filter and bias network 30 to base 34 of transistor 33.

Transistor 33 acts as the ACC amplifier for the receiver. With no burst signal present transistor 33 is biased to nonconduction as base 34 is coupled to ground through resistor 32 and emitter 36 is also coupled to ground through resistor 38. Since no current flows from collector 35 to emitter 36, there is no voltage drop across resistor 39 and the potential of collector 35 is equal to the positive supply potential. When burst signals are applied to base 34, transistor 33 conducts causing current to flow through resistor 39 reducing the collector potential. This reduction in collector potential is coupled to base 15 of transistor 12, in a manner to be subsequently described to regulate the bias of transistor 12.

Transistor 50 is also biased to nonconduction with no burst signal present. The full positive potential is applied through resistors 39 and 55 to base 51 of transistor 50 while a reduced bias potential is applied from voltage divider resistors 58 and 59 to emitter 52. Thus base 51 is more positive than emitter 52 reverse biasing transistor 50 and the potential on collector 53 is determined by the potential on base 34 of transistor 33 coupled through resistor 56.

When a positive potential (from the burst signals) is applied to base 34 of transistor 33 the transistor conducts. As the magnitude of the burst signals increases the conduction of transistor 33 increases and the potential on collector 35 decreases. This decreased potential on collector 35 is coupled to base 51 of transistor 50 through resistor 55. When the potential on base 51 reaches a point where transistor 50 begins to conduct, a regenerative switching action takes place. As transistor 50 conducts the potential on collector 53 rises and this rise in potential is coupled back through resistor 56 to base 34 of transistor 33 causing the conduction of transistor 33 to increase. The increased conduction of transistor 33 further decreases the bias on base 51 of transistor 50 causing conduction of transistor 50 to increase still further. This regenerative action continues until transistor 50 is completely switched from a nonconducting conduction to a saturated condition.

In order to permit transistor 33 to operate as an amplifier when the regenerative circuit has been switched so that transistor 50 is in saturation, transistor 33 must be biased to a conducting condition less than saturation while transistor 50 is biased to saturation. This is accomplished by establishing the gain of the various feedback paths including the transistor amplifiers at particular levels. The gain from the output electrode of transistor 50, collector 53, through the feedback path consisting of resistors 56, 31 and 32 to base 34 and the output electrode of transistor 33, collector 35, must be less than one, while the gain of the feedback path from the output electrode of transistor 33, collector 35, through resistor 55 and base 51 to the output electrode of transistor 50, collector 53, must be greater than one. The degree of conduction of transistor 33 is then determined by the relationship between the relative gains of these two paths. In the circuit shown in the FIGURE the feedback path from collector 53 of transistor 50 to base 34 of transistor 33 includes a voltage divider circuit consisting of resistor 56 and resistors 31 and 32 to ground. Some of the current flowing through resistor 56 also flows through the base 34, emitter 36 junction of transistor 33 and resistor 38 to ground. Thus transistor 33 and resistor 38 also determine the gain of the feedback path. The gain determining elements of the feedback path from collector 35 of transistor 33 to base 51 of transistor 50 includes resistor 55 and resistor 59. The bias levels of the regenerative circuit are also chosen so that when the magnitude of the color burst signal is sufficiently high to indicate that the color signal is being received by the television receiver, the regenerative switching action of transistors 33 and 50 takes place. An example of the values which may be used in the circuit of FIG. 1 are shown below, however, the circuit is not limited to these values or components.

| | |
|---|---|
| Resistor 31 | 82 k ohms |
| Resistor 32 | 10 k ohms |
| Resistor 38 | 4.7 k ohms |
| Resistor 39 | 47 k ohms |
| Resistor 55 | 47 k ohms |
| Resistor 56 | 820 k ohms |
| Resistor 58 | 6.8 k ohms |
| Resistor 59 | 18 k ohms |
| Resistor Transistor 33 | 4918 |
| Transistor 50 | 4910 |

With no color signal present a potential is applied from the positive supply through resistors 40 and 41 acting as a voltage divider and through resistor 44 to base 15 of transistor 12. The emitter 14 of transistor 12 is biased through resistor 17 connected to the voltage divider consisting of resistors 19 and 22. The values of these resistors are chosen so that with no signal present, transistor 12 is biased to a maximum gain condition. With no color signal present transistor 50 is not conducting and therefore collector 53 of transistor 50 is at ground potential. The potential appearing on collector 53 is coupled through resistor 61 to the second color signal amplifier 23 to bias the second color signal amplifier to cutoff. Capacitor 62 acts as a filter capacitor for this bias line.

As the burst signals applied to base 34 of transistor 33 increase, the potential on collector 35 decreases. However, this decrease is blocked from the bias circuit for base 15 of transistor 12 as diode 47 is reversed biased. Thus with no color signal present, or a signal too weak to be usable, any AGC action of the ACC circuit is blocked by diode 47. Thus diode 47 acts to provide a voltage or signal magnitude delay in the bias signal to transistor 12.

When a color signal is being received and the regenerative switching action described above takes place, the potential on collector 53 rises to a relatively high positive value biasing the second color signal amplifier 23 to conduction to pass the color signal to the color demodulators. The regenerative switching action also causes the potential on collector 35 of transistor 33 to drop to a value just above the threshold of conduction for diode 47. Thus after the regenerative switching action takes place diode 47 does not conduct but is on the threshold of conduction. This is done so as to prevent the sudden switching action of the regenerative circuit from affecting the gain control bias applied to transistor 12. As the amplitude of the burst signal applied to base 34 further increases, the potential on collector 35 is reduced to a value at which diode 47 conducts. From this point on the potential on collector 35 is coupled to base 15 and acts to reduce the gain of transistor stage. This reduction in gain with increasing signal strength continues until a balance point is reached, at which time the output of the color signal amplifiers 12 and 23 coupled to the color demodulators is regulated to maintain a relatively constant value.

Thus a combined ACC and regenerative color killer circuit which uses two transistors has been described. The gains of the transistors and feedback paths of the regenerative circuit are chosen so that one transistor operates in a fully saturated condition after regenerative switching takes place while the other transistor operates in a conducting condition less than saturation so that it can be used as the automatic color control bias amplifier for the circuit.

I claim:

1. A combined ACC amplifier and regenerative killer circuit for a color television receiver, including in combination, a first color signal amplifier having an input and an output and adapted to receive a bias signal at said input thereof, being responsive to said bias signal above a predetermined magnitude whereby the gain thereof is regulated in a desired manner and further being responsive to said bias signal below said predetermined magnitude to be biased to a maximum gain condition, a second color signal amplifier having an input and an output with the input thereof being coupled with the output of said first color signal amplifier, said second color signal amplifier being biased to nonconduction and further being adapted to be biased to conduction by the application of a switching signal to the input thereof, a bias amplifier circuit having an input and an output, with the input thereof coupled with the output of said first first color signal amplifier and adapted to receive therefrom an input signal proportional to the strength of said color signal, said bias amplifier circuit being responsive to said input signal to develop said bias signal, first circuit means coupled with the output of said bias amplifier circuit and forming therewith a regenerative circuit, said regenerative circuit being coupled with the input of said second color signal amplifier and further being responsive to the magnitude of said bias signal to develop a switching action with said bias signal above a particular magnitude less than said predetermined magnitude whereby said switching signal is developed and applied to the input of said second color signal amplifier to bias the same to conduction and whereby the magnitude of said bias signal is abruptly changed to a magnitude greater than said predetermined magnitude to regulate the gain of said first color signal amplifier.

2. A combined ACC amplifier and regenerative killer circuit for a color television receiver, including in combination, first amplifier means adapted to receive a color signal, at the input thereof second amplifier means the input of which is coupled with the output of said first amplifier means, said second amplifier means being biased to nonconduction and further being adapted to be biased to conduction by the application of a switch signal to the input thereof, third amplifier means the input of which is coupled with the output of said first amplifier means and adapted to receive therefrom an input signal proportional to the magnitude of said color signal, said third amplifier means being responsive to said input signal to develop therefrom a bias signal, first circuit means coupling the output of said third amplifier means to the input of said first amplifier means for applying said bias signal thereto, fourth amplifier means coupled to said third amplifier means and forming therewith regenerative circuit means, second circuit means coupling the output of said regenerative circuit means to the input of said second amplifier means, said regenerative circuit means being in a first state with said input signal below a particular magnitude whereby said bias signal is in a first range, said regenerative circuit means being responsive to said input signal above said particular magnitude whereby a regenerative action takes place shifting said regenerative circuit means to a second state to develop said switch signal and further abruptly changing said bias signal to a second range having a magnitude greater than said first range, said first amplifier means being responsive to said bias signal in said second range whereby the gain thereof is regulated and to said bias signal in said first range whereby said first amplifier means is biased to a maximum gain condition, said second amplifier means being responsive to said switch signal to become biased to conduction.

3. The combined ACC amplifier and regenerative killer circuit of claim 2 wherein, said third amplifier means includes a first transistor having an input electrode coupled with the output of said first amplifier means for receiving said input signal therefrom, and an output electrode coupled to said first circuit means for applying said bias signal thereto, and said fourth amplifier means includes a second transistor having input and output electrodes coupled to said output and input electrodes respectively of said first transistor to form said regenerative circuit means, and said second transistor further having said output electrode thereof coupled to the input of said second circuit means.

4. The combined ACC amplifier and regenerative killer circuit of claim 3 wherein, said first circuit means includes signal magnitude delay means to block said bias signal from said first amplifier means with said bias signal below a predetermined magnitude.

5. The combined ACC amplifier and regenerative killer circuit of claim 4 wherein, said signal magnitude delay means includes a diode coupling said first transistor output electrode to the input of said first amplifier means, and bias circuit means coupled to said diode for applying a reverse bias thereto with said bias signal below said predetermined magnitude.

6. The combined ACC amplifier and regenerative killer circuit of claim 3 wherein, first feedback circuit means couples said output electrode of said second transistor to said input electrode of said first transistor and second feedback circuit means couples said output electrode of said first transitor to to said input electrode of said second transistor, the combined gain of said first feedback circuit means and said first transistor being less than one and the combined gain of said second feedback path and said second transistor being greater than one, so that with said regenerative circuit means in said second state said second transistor is biased to saturation and said first transistor is biased to a conductive state less than saturation.

7. The combined ACC amplifier and regenerative killer circuit of claim 6 wherein, said input electrode of said first transistor is a base electrode coupled with the output of said first amplifier means and said first feedback circuit means, and said output electrode of said first transistor is a collector electrode coupled to said second feedback circuit means, said first circuit means includes at least one diode coupling said collector electrode of said first transistor with the input of said first amplifier means, said input electrode of said second transistor is a base electrode coupled to said second feedback circuit means and said output electrode of said second transistor is a collector electrode coupled to said first feedback circuit means and to said second circuit means.

8. A combined regenerative switching circuit and amplifier circuit, including in combination, a first transistor having an input electrode adapted to receive an input signal and an output electrode, said first transistor being responsive to said input signal to develop an output signal proportional thereto, a second transistor having input and output electrodes, first feedback circuit means coupling said output electrode of said second transistor to said input electrode of said first transistor and second feedback circuit means coupling said output electrode of said first transistor to said input electrode of said second transistor, said first and second transistors and said first and second feedback circuit means forming a regenerative switching circuit, bias circuit means coupled to said first and second transistors for biasing said first transistor and second transistor to nonconduction, said regenerative switching circuit being responsive to said input signal above a particular magnitude whereby a regenerative switching action takes place and second transistor is biased to saturation, the combined gain of said second transistor and said second feedback circuit means being greater than one and the combined gain of said first transistor and said first feedback circuit means being less than one whereby said first transistor is biased to a conducting region less than saturation with said second transistor biased to saturation.